(12) United States Patent
Gopalakrishnan et al.

(10) Patent No.: US 9,607,360 B2
(45) Date of Patent: Mar. 28, 2017

(54) MODIFYING THE SIZE OF DOCUMENT CONTENT BASED ON A PRE-DETERMINED THRESHOLD VALUE

(71) Applicant: Xerox Corporation, Norwalk, CT (US)

(72) Inventors: Sainarayanan Gopalakrishnan, Chennai (IN); Dhevendra Alagan Palanivel, Chennai (IN); Rajasekar Kanagasabai, Chennai (IN); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 381 days.

(21) Appl. No.: 14/452,576

(22) Filed: Aug. 6, 2014

(65) Prior Publication Data
US 2016/0042497 A1    Feb. 11, 2016

(51) Int. Cl.
*G06T 3/40* (2006.01)
*G06F 17/21* (2006.01)

(52) U.S. Cl.
CPC .......... *G06T 3/4092* (2013.01); *G06F 17/212* (2013.01); *G06F 17/214* (2013.01)

(58) Field of Classification Search
None
See application file for complete search history.

(56) References Cited

U.S. PATENT DOCUMENTS

| | | |
|---|---|---|
| 4,928,252 A | 5/1990 | Gabbe et al. |
| 7,944,581 B2 | 5/2011 | Shepherd et al. |
| 8,014,013 B2 | 9/2011 | Owen et al. |
| 8,384,918 B2 | 2/2013 | Zhan |
| 8,451,478 B2 | 5/2013 | Tsunekawa |
| 8,503,030 B2 | 8/2013 | Goldwater et al. |
| 2007/0041051 A1 | 2/2007 | Tanaka |

*Primary Examiner* — Asher Kells

(57) ABSTRACT

Various embodiments for methods and systems for processing documents are disclosed. A size of at least a part of a content in an electronic document is determined. Size of the part of the content is modified based at least on a pre-determined threshold value for size and the determined size. Further, various embodiments for methods and systems for processing N-Up documents are disclosed. One or more page images from an N-Up document are extracted based on an analysis of a content distribution in the N-Up document. A size of a content in at least a part of extracted one or more page images is determined. The size of the content is modified in accordance to a pre-determined threshold value receive from a user.

23 Claims, 7 Drawing Sheets

MODIFYING THE SIZE OF DOCUMENT CONTENT BASED ON A PRE-DETERMINED THRESHOLD VALUE

TECHNICAL FIELD

The presently disclosed embodiments are related, in general, to processing of documents. More particularly, the presently disclosed embodiments are related to methods and systems for modifying size of content in the documents.

BACKGROUND

Computing devices (e.g., desktop computers, laptops, personal digital assistants (PDAs), tablets, mobile devices, multifunctional devices (MFDs), smartphones, and televisions) have display associated with them that may be used for viewing electronic documents. The resolution with which the electronic documents may be viewed on such computing devices may be limited by the hardware of the display. A user of such device may have to zoom-in/out to improve the readability of the content in the electronic document. Different content may have different zoom-in/out requirements. For instance, a user may utilize a mobile device to view two electronic documents, one with font size of content 12, and another with font size of content as 18. Further, the user may utilize the mobile device to view a single electronic document in with different portions containing content of different font sizes. Thus, in order to improve readability, the user may have to zoom-in/out to read some portions of a single or multiple electronic documents on an electronic device such as a mobile phone.

Due to an increased need for user-interaction (e.g., performing UI operations such as zooming in/out, panning, etc.), the user may experience usability issues with the electronic device. Further, the need for a higher user-interaction may lead to an increase in time and computation requirements associated with the electronic device, thereby increasing its cost and complexity.

In addition, the computing devices (e.g., MFDs) may be utilized for printing/scanning/copying multiple page images in a single document. One of the motives for printing multiple page images in a single document may be to save paper. Typically, such techniques, where multiple page images are printed/copied/scanned in a single document are referred to as N-Up techniques, and the printed/scanned/copied document, including the multiple page images is referred to as an N-Up document. However, there may be scenarios, where N-Up documents include font sizes that are difficult to read (e.g. if the font sizes are too small) for a user. In such cases, if original page images, from which N-Up document is created, are not available, it may be difficult to get the documents with desired font size.

SUMMARY

According to embodiments illustrated herein, there is provided a method for processing an N-Up document comprising one or more page images. The method includes extracting said one or more page images from said N-Up document based on an analysis of a content distribution in said N-Up document. The method further includes determining a size of said content in at least a part of said extracted one or more page images. The method further includes modifying said size of said content in accordance to a pre-determined threshold value received from a user. The method is performed by one or more processors.

According to embodiments illustrated herein, there is provided a method for processing an electronic document on a computing device. The method includes determining a size of at least a part of a content in said electronic document. The method further includes modifying said size of said part of said content based at least on a pre-determined threshold value for size and said determined size. The method is performed by one or more processors.

According to embodiments illustrated herein, there is provided a system for processing an N-Up document comprising one or more page images. The system includes one or more processors operable to extract said one or more page images from said N-Up document based on an analysis of a content distribution in said N-Up document. The one or more processors are further operable to determine a size of said content in at least a part of said extracted one or more page images. The one or more processors are further operable to modify said size of said content in accordance to a pre-determined threshold value received from a user.

According to embodiments illustrated herein, there is provided a system for processing an electronic document on a computing device. The system includes one or more processors operable to determine a size of least a part of a content in said electronic document. The one or more processors are further operable to modify said size of said part of said content based at least on a pre-determined threshold value for size and said determined size.

According to embodiments illustrated herein, there is provided a computer program product for use with a computer. The computer program product includes a non-transitory computer readable medium. The non-transitory computer readable medium stores a computer program code for processing an N-Up document comprising one or more page images. The computer program code is executable by one or more processors to extract said one or more page images from said N-Up document based on an analysis of a content distribution in said N-Up document. The computer program code is further executable by the one or more processors to determine a size of said content in at least a part of said extracted one or more page images. The computer program code is further executable by the one or more processors to modify said size of said content in accordance to a pre-determined threshold value received from a user.

According to embodiments illustrated herein, there is provided a computer program product for use with a computer. The computer program product includes a non-transitory computer readable medium. The non-transitory computer readable medium stores a computer program code for processing an electronic document on a computing device. The computer program code is executable by one or more processors to determine a size of at least a part of a content in said electronic document. The computer program code is further executable by the one or more processors to modify said size of said part of said content based at least on a pre-determined threshold value for size and said determined size.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
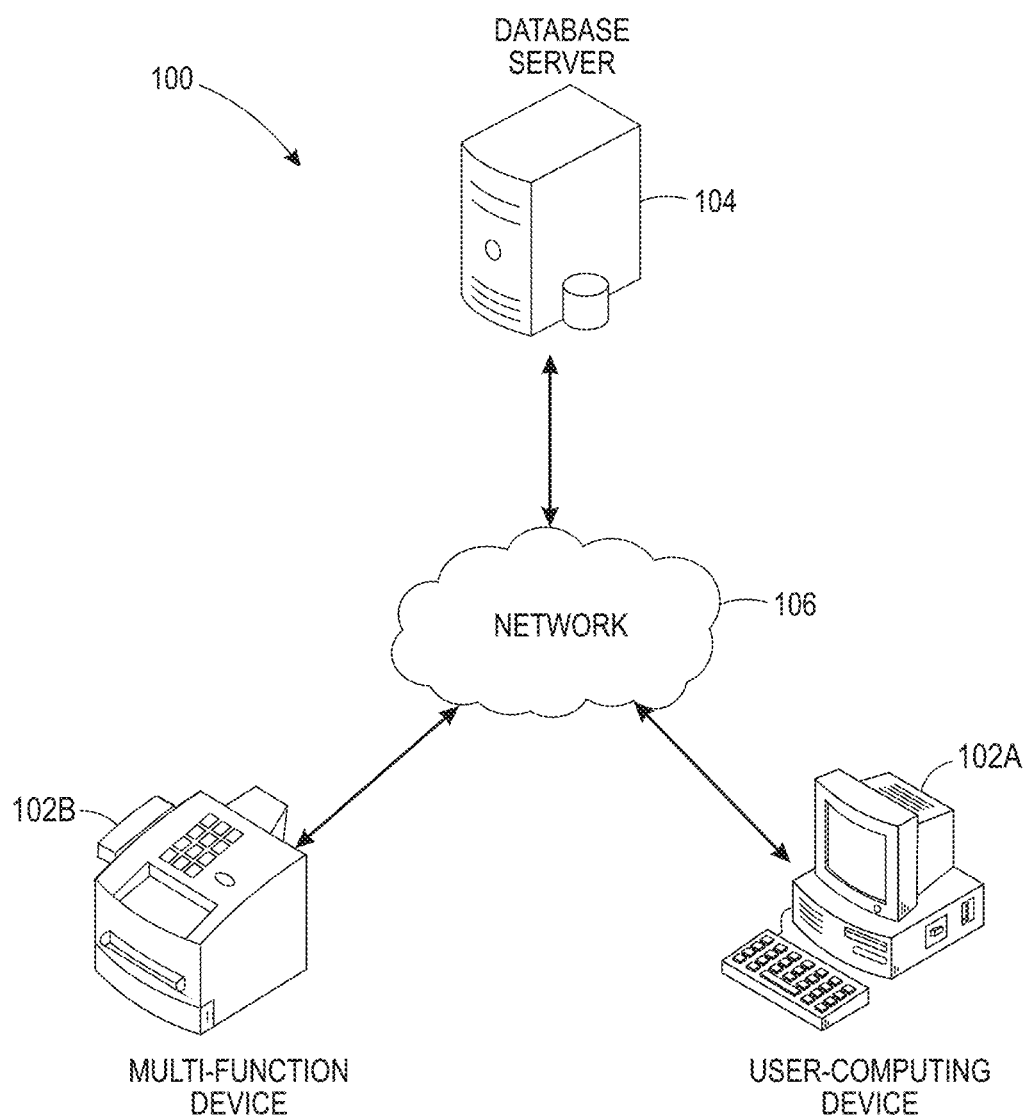
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "computing device" refers to a device that includes a processor/microcontroller and/or any other electronic component, or a device or a system that performs one or more operations according to one or more programming instructions. In an embodiment, the computing device has an associated display that may be utilized for displaying one or more electronic documents. In an embodiment, the electronic document corresponds to an N-Up document that further includes one or more page images. Examples of the computing device may include, but are not limited to, a desktop computer, a laptop, a PDA, a mobile device, an MFD, a smartphone, a tablet computer (e.g., iPad®, and Samsung Galaxy Tab®), a television, and the like.

A "Multi Function Device" (MFD) refers to a computing device that can perform multiple functions. Examples of the functions may include, but are not limited to, printing, scanning, copying, faxing, emailing, and the like. In an embodiment, the MFD includes a scanner and a printer for scanning and printing one or more page images, respectively. In an embodiment, the MFD has communication capabilities that enable the MFD to send/receive data and messages in accordance with one or more communication protocols such as, but not limited to, HTTP, FTP, WebDAV, E-mail, SMB, NFS, and TWAIN.

A "page images" refers a written, printed, or an electronic matter furnishing information or content. In an embodiment, the content or information may include, but not limited to, one or more pictures, symbols, text, line art, blank, or non-printed regions, etc. In an embodiment, an electronic document may be obtained by scanning a corresponding printed page images. Subsequently, Further, the electronic document may be stored in various file formats, such as, JPG or JPEG, GIF, TIFF, PNG, BMP, RAW, PSD, PSP, PDF, and the like.

An "N-Up document" refers to an aggregation of one or more page images. In an embodiment, the one or more page images (in electronic form) may be combined (e.g., during printing) to form one printed N-Up document. In an embodiment, the size of the content in the one or more page images may be modified/adjusted in order to fit the one or more page images in one N-Up document. In a similar way, the one or more page images (in printed form) may be combined (e.g., during copying/scanning) to form one printed/electronic N-Up document. In an embodiment, a user may provide the value of N (i.e., the number of page images to be combined to form one N-Up document) using a user-interface provided on the MFD.

A "content distribution" refers to a distribution of content (e.g., image content or text content) in the document. In an embodiment, the content distribution in the electronic document is determined to analyze the intensity of pixels values in different parts of the electronic document. The content distribution in the electronic document may be determined based on, but not limited to, a projection profile of pixels, boundary detection methods, segmentation methods, and the like.

A "projection profile of pixels" refers to a pattern associated with the summation of intensity values of pixels available in a page images. The projection profile of pixels may correspond to a graphical plot (e.g., histogram) illustrating summation of the intensity values of pixels. In an embodiment, the projection profile of pixels may be determined across the vertical and horizontal direction of the page image to determine intensity values of pixel in the respective direction.

A "size" of the content in the page images refers to dimensions of text content included in the page image. In an embodiment, the size of the content may refer to a font size of the text included in the page image. In an embodiment, the font size may be represented in the form of numerical values. In an alternate embodiment, the font size may be represented in the form of small/medium/large.

FIG. 1 is a block diagram illustrating a system environment 100 in which various embodiments may be implemented. The system environment 100 includes user-computing device 102a, an MFD 102b, a database server 104, and a network 106. Various devices in the system environment 100 (e.g., the user-computing device 102a, the MFD 102b, and the database server 104) may be interconnected over the network 106.

The user-computing device 102a refers to a computing device that may be utilized for viewing electronic documents. In an embodiment, the user-computing device 102a may have an associated display that displays the electronic documents to a user. In an embodiment, an electronic document may correspond to an electronic N-Up document, which includes one or more page images. In an embodiment, the user-computing device 102a may be utilized for processing the electronic documents. In such a scenario, the user-computing device 102a may modify the size of the content included in the electronic document. Further details about the processing of the electronic document have been discussed in conjunction with the FIG. 3.

In an embodiment, the user-computing device 102a may be utilized for accessing the MFD 102b over the network 106. The user may access the MFD 102b to provide inputs to the MFD 102b. For example, the user may provide the inputs to the MFD 102b to print one or more page images to create an N-Up. The user may provide the inputs using various types of input devices (e.g., keyboard, mouse, and touch-interface) associated with the user-computing device 102a. In an embodiment, using the user-computing device 102a, the user may instruct the MFD 102b to process the already created N-Up document. In such a scenario, the user may provide a pre-determined threshold value for the size of the content based on his/her requirements, and subsequently, the MFD 102b may process the N-Up document. Further details about the processing of the N-Up document have been discussed later in conjunction with FIG. 4. The user-computing device 102a may correspond to various types of computing devices, such as, but not limited to, a desktop computer, a laptop, a personal digital assistant (PDA), a mobile device, a smartphone, a tablet computer (e.g., iPad®, and Samsung Galaxy Tab®), a television, and the like.

The MFD 102b refers to a computing device that may process the N-Up document. In an embodiment, for processing the N-Up document, the MFD 102b determines a count of the one or more page images included in the N-Up document. Subsequently, the MFD 102b extracts the one or more page images from the N-Up document. Further, the MFD 102b determines the size of the content in each of the extracted one or more page images. The MFD 102b compares the determined size with the pre-determined threshold value for the size (e.g., provided by the user). Based on the comparison, the MFD 102b may modify the size of the content associated with each of the one or more page images. In an embodiment, the MFD 102b combines the one or more page images, with modified size of the content, to form one or more new N-Up documents. The count of the one or more page images in the new N-Up documents may be different from the count of the one or more page images in the original N-Up document. The MFD 102b may include various types of computing devices, such as, but not limited to, printers, scanners, copiers, fax-machines, desktop computers, laptops, PDAs, smartphones, mobile devices, tablet computers, and the like.

A person having ordinary skill in the art would understand that the scope of the disclosure is not limited to the MFD 102b for processing the N-up document. In an embodiment, the user-computing device 102a can process the N-Up document.

The database server 104 refers to a computing device that stores various types of information pertaining to the N-Up documents. In an embodiment, the database server 104 may store the extracted one or more page images from the N-Up documents. Further, the database server 104 may store the pre-determined threshold values for the size of the content corresponding to different users. For example, the database server 104 may store a mapping between different users and the respective pre-defined threshold values provided by them. In an embodiment, the database server 104 may receive the new N-Up documents, with a modified size of the content, from the MFD 102b. In an embodiment, the database server 104 may receive a query from the MFD 102b for receiving the above discussed information. For querying the database server 104, one or more querying languages may be utilized such as, but not limited to, SQL, QUEL, DMX, and so forth. Further, the database server 104 may be realized through various technologies such as, but not limited to, Microsoft® SQL server, Oracle, and My SQL. In an embodiment, the database server 104 may connect to the MFD 102b, using one or more protocols such as, but not limited to, ODBC protocol and JDBC protocol.

It will be apparent to a person skilled in the art that the functionalities of the database server 104 may be incorporated into the MFD 102b, without departing from the scope of the disclosure. In such a scenario, various types of information, as disclosed above, may be stored in the MFD 102b.

The network 106 corresponds to a medium through which content and messages flow between various devices of the system environment 100 (e.g., the user-computing device 102a, the MFD 102b, and the database server 104). Examples of the network 106 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 106 in accordance with various wired and wireless communication protocols such as Transmission Control Protocol and Internet Protocol (TCP/IP), User Datagram Protocol (UDP), and 2G, 3G, or 4G communication protocols.

Figure 2:
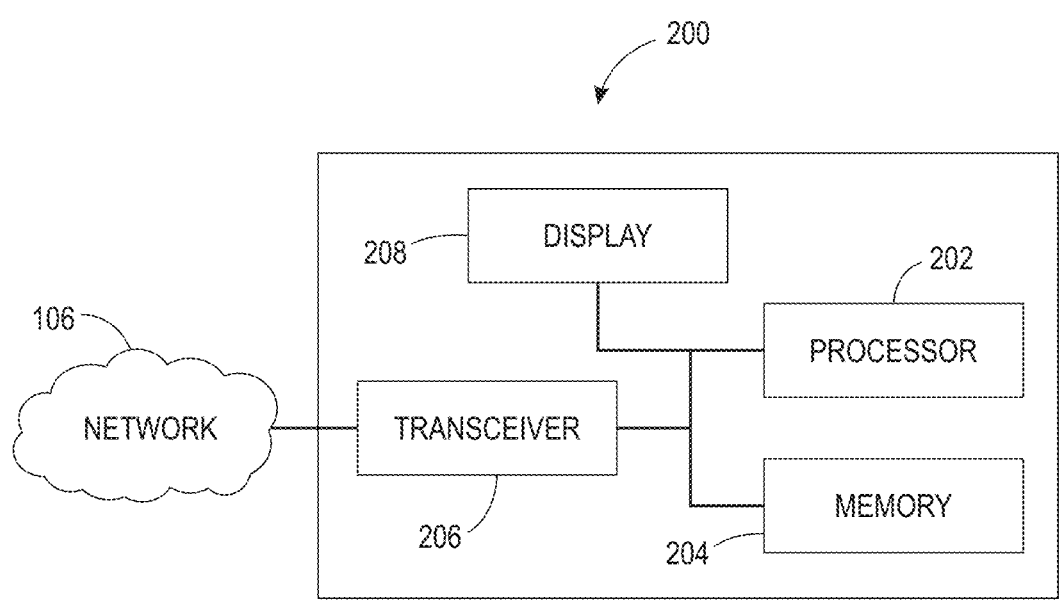
FIG. 2 is a block diagram illustrating a computing device, in accordance with at least one embodiment.

FIG. 2 is a block diagram illustrating a computing device 200, in accordance with at least one embodiment. The computing device 200 may correspond to at least one of the user-computing device 102a or the MFD 102b. Further, the computing device 200 includes a processor 202, a memory 204, a transceiver 206, and a display 208.

The processor 202 is coupled to the memory 204, the transceiver 206, and the display 208. The processor 202 includes suitable logic, circuitry, and/or interfaces that are operable to execute one or more instructions stored in the memory 204 to perform pre-determined operation. The memory 204 may be operable to store the one or more instructions. The processor 202 may be implemented using one or more processor technologies known in the art. Examples of the processor 202 include, but are not limited to, an X86 processor, a RISC processor, an ASIC processor, a CISC processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It will be apparent to a person having ordinary skill in the art that the one or more instructions stored in the memory 204 enables the hardware of the computing device 200 to perform the predetermined operation.

The transceiver 206 transmits and receives messages and data to/from various components of the system environment 100. Examples of the transceiver 206 may include, but are not limited to, an antenna, an Ethernet port, an USB port or any other port that can be configured to receive and transmit data. The transceiver 206 transmits and receives data/messages in accordance with various communication protocols, such as, TCP/IP, UDP, and 2G, 3G, or 4G communication protocols.

The display 208 facilitates the user to view information presented on the computing device 200. For example, the user may view the electronic documents on the display 208. The display 208 may be realized through several known technologies, such as Cathode Ray Tube (CRT) based display, Liquid Crystal Display (LCD), Light Emitting Diode (LED)-based display, Organic LED display technology, and Retina Display technology. In an embodiment, the display 208 can be a touch screen that is operable to receive a user-input.

In an embodiment, the computing device 200 corresponds to the user-computing device 102a. In such a scenario, the operation of the user-computing device 102a for processing the electronic documents has been described in conjunction with FIG. 3.

Figure 3:
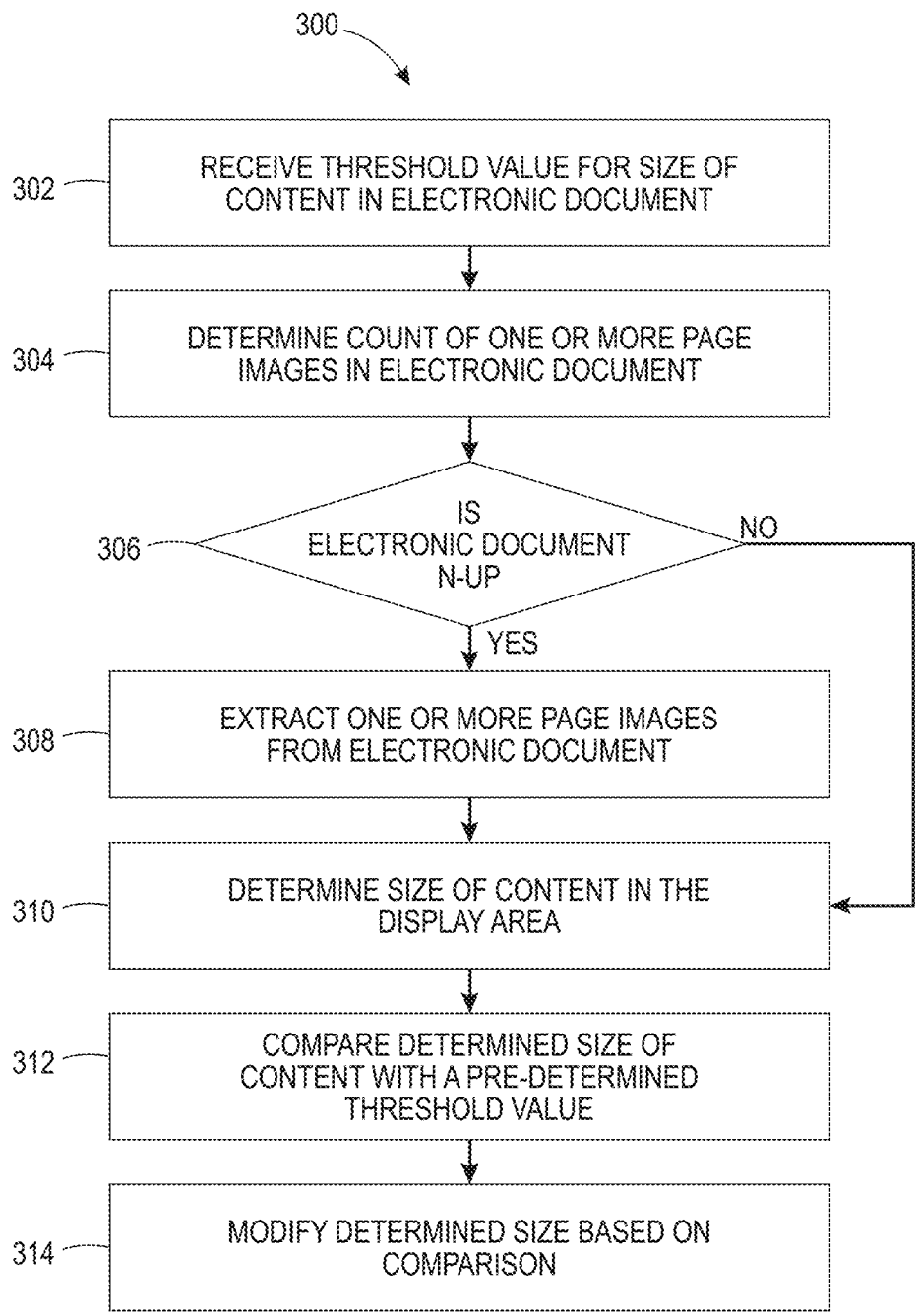
FIG. 3 is a flowchart illustrating a method for processing electronic documents, in accordance with at least one embodiment.

FIG. 3 is a flowchart 300 illustrating a method for processing the electronic document, in accordance with at least one embodiment. The flowchart 300 is described in conjunction with FIG. 1 and FIG. 2.

At step 302, the threshold value for the size of content is received. In an embodiment, the processor 202 is configured to receive the threshold value through the input devices (e.g., keyboard, mouse, and touch-interface) associated with the system 200. As discussed above, the computing device 200 may correspond to the user-computing device 102a or the MFD 102b. In a scenario, where the computing device 200 corresponds to the user-computing device 102a, the input devices of the user-computing device 102a are utilized by the user to provide the threshold value. In an embodiment, the user may provide the threshold value based on his/her reading/usability requirements.

For example, the user may provide the threshold value of font size "10" based on his/her requirements. In an embodiment, the threshold value corresponding to the user may be stored in the memory 204.

At step 304, the count of the one or more page images included in the electronic document is determined. As discussed, the electronic document that is displayed on the display 208 of the user-computing device 102a may be an N-Up document. Thus, the processor 202 determines the count to determine whether the electronic document being viewed is an N-Up document. In an embodiment, the processor 202 determines the count based on an analysis of a content distribution in the electronic document. For example, the processor 202 may analyze a projection profile of pixels in the electronic document to determine the content distribution. Other techniques that may be utilized for analyzing the content distribution may include, but are not limited to, boundary detection methods, segmentation methods and the like. In an embodiment, the processor 202 analyzes the projection profile of pixels along the horizontal and vertical direction of the electronic document. The analysis of the projection profile of pixels along the horizontal direction may provide the number of columns of page images along the horizontal direction and the analysis of the projection profile of pixels along the vertical direction may provide the number of rows of page images along the vertical direction of the electronic document. In an embodiment, the analysis of the projection profile includes the determination of the number and width of valleys in the graphical plot of the projection profiles along each of the vertical and horizontal direction. In an embodiment, the valleys may correspond to absence of pixels in the corresponding region of the electronic document. Based on the number and width of the valleys, the processor 202 may determine the count of the one or more page images. For example, if the graphical plot of projection profile along the horizontal direction of the electronic document includes one valley, then the electronic document may include two columns of the page images along the horizontal direction. In a similar way, the number of rows of the page images along the vertical direction of the electronic document may be determined. Based on the number of rows and columns, the processor 202 may determine the number of page images in the electronic document. For example, if the number of rows is two and the number of columns is three, then the number of page images in the electronic document will be six. In an embodiment, the count of the one or more page images in the electronic document is N. Further illustration of the determination of the count of the one or more page images in the electronic documents has been discussed in conjunction with FIG. 6.

At step 306, it is determined whether the electronic document is an N-Up document. Based on the count of the one or more page images included in the electronic document, the processor 202 may determine whether the electronic document is an N-Up document. For example, if the count of the one or more page images is one, then the electronic document is not an N-Up document, else the electronic document corresponds to an N-Up document. In an embodiment, if the processor 202 determines that the electronic document is an N-Up document, then step 308 is performed; else step 310 is performed.

At step 308, the one or more page images included in the electronic document are extracted. The processor 202 extracts the one or more page images post identifying the count of the one or more page images. In an embodiment, the processor 202 may extract the one or more page images based on the identification of the boundaries of the individual page images in the electronic document. In an embodiment, the processor 202 may utilize the projection profiles of electronic document to extract the page images. The processor 202 may extract N individual page images (i.e., the count of the one or more page images in the electronic document) from the electronic document based on the known techniques. Further, the processor 202 may display the individual N page images, one by one, on the display 208.

At step 310, the size of the content being displayed in the display area of the display 208 is determined. A person having ordinary skill in the art would understand that complete electronic document may not fit in the display 208 due to hardware restriction of the display 208. In such a scenario, the processor 202 determines the portion of the electronic document being displayed on the display 208. In an embodiment, the processor 202 may access a buffer memory associated with the display 208 to determine the portion of the electronic document. Thereafter, the processor 202 may determine the size of the content in the portion of the electronic document being displayed based on known techniques, such as segmentation methods using connected components. In an embodiment, using such techniques, the processor 202 may separate the text portion and the image portion included in the content. Subsequently, the processor 202 may determine the size of the content. For example, the processor 202 may determine the font sizes associated with the text portion included in the display area. It will be apparent to a person skilled in the art that the determination of the size of the content should not be limited to using segmentation methods only. Other known techniques, for determining the size of the content in the electronic documents, may also be used without departing from the scope of the disclosure.

At step 312, the determined size of the content in the display area of the display 208 is compared with the predetermined threshold value (received in conjunction with the step 302). The processor 202 may compare the determined size with the threshold value. It will be apparent to a person skilled in the art that based on the comparison, the processor 202 may determine that the size of the content may be smaller/larger/equal to the threshold value provided by the user.

At step 314, the determined size of the content is modified. In an embodiment, based on the comparison performed in previous step (i.e., the step 312), the processor 202 may modify the size of the content. For example, if the processor 202 determines that the size of the content is less than the required threshold value, the processor 202 may scale up the size. In a similar way, if the processor 202 determines that the size of the content is larger than the required threshold value, the processor 202 may scale down the size. For example, if the user provides the threshold values of x for the text portion of the page images, and the determined font size of the text in the display area of the display 208 is x/2, then the processor 202 may scale up the font size of the text to 200%.

In an embodiment, as the user navigates through the electronic document, the processor 202 may update the size of the content included in the display area of the display 208 on the fly. For example, if the user scrolls the electronic document on the user-computing device 102a, and if the size of the content included in the display area is changed, the processor 202 may update the size, based on the threshold value. It will be apparent to a person skilled in the art that in this way, the user may view the content of the electronic document without further interactions, and the size may be automatically modified based on the size of content being displayed on the display 208. Further illustration of the modification of the size of the content has been discussed in conjunction with the FIG. 7.

In an embodiment, the processor 202 may determine the minimum size of the content included in the electronic document, and subsequently, may modify the size of the content of complete electronic document, based on the determined minimum size. For example, if the minimum font size of the text included in the electronic document is determined to be 4, and if the threshold value provided by the user is font size 12, then the processor 202 may modify the font size of the content of complete electronic document to 12.

It will be apparent to a person skilled in the art that the method for the modification of the size of the content, as disclosed above, may also be implemented on the MFD 102b, without departing from the scope of the disclosure.

In an embodiment, the computing device 200 corresponds to the MFD 102b. In such a scenario, the operation of the MFD 102b for processing an N-Up document has been described in conjunction with FIG. 4 and FIG. 5.

Figure 4:
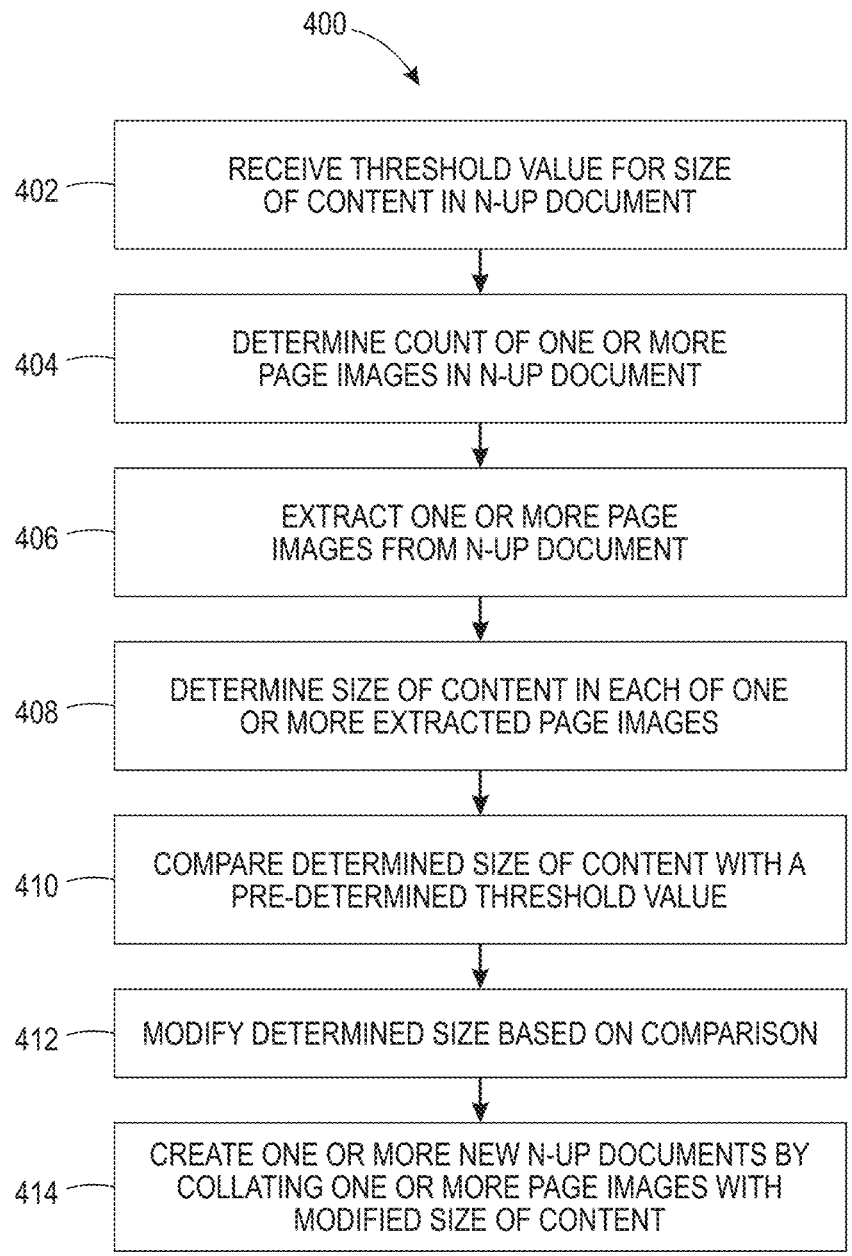
FIG. 4 is a flowchart illustrating a method for processing N-Up documents, in accordance with at least one embodiment.

In an embodiment, the user may instruct the MFD 102b to process the N-Up document. For example, the size of the content in the N-Up document may be too small to read. In such a case, the user may instruct the MFD 102b to process the N-Up document, and the processor 202 may subsequently process the N-Up document. As discussed, the N-Up document may correspond to a printed N-Up document or an electronic N-Up document, each including one or more page images. FIG. 4 is a flowchart 400 illustrating a method for processing N-Up documents, in accordance with at least one embodiment. The flowchart 400 has been described in conjunction with FIG. 1, FIG. 2, and FIG. 3.

At step 402, the threshold value for the size of the content is received. In an embodiment, the user may provide the threshold value using the user-computing device 102a. In an alternate embodiment, the user may provide the threshold value through a user-interface provided on the display 208 associated with the MFD 102b. Further details about receiving the threshold value for the size of the content have already been discussed in conjunction with the FIG. 3.

In an embodiment, different users may provide different threshold values, and mapping of such information may be stored in the database server 104. Subsequently, the processor 202 may retrieve the information from the database server 104, and may process the request for processing the N-Up documents. Table 1 illustrates the mapping of threshold values for three users:

TABLE 1

Illustration of the threshold values corresponding to three users.

| User | Threshold value for the text portion |
|---|---|
| User-1 | 8 |
| User-2 | 10 |
| User-3 | 12 |

At step 404, the count of the one or more page images in the N-Up document is determined. Details about the determination of the count of the one or more page images have already been discussed in conjunction with the step 304.

At step 406, the one or more page images are extracted from the N-Up document. The processor 202 may extract the one or more page images from the N-Up document, as described in conjunction with the step 308.

At step 408, the size of content in each of the extracted one or more page images is determined. The processor 202 determines the size of text portion included in the extracted page images, as described in conjunction with the step 310. In an embodiment, for determining the size of the content in an extracted page image, the processor 202 determines the minimum size of the content included in the extracted page image.

At step 410, the processor 202 compares the determined size in the extracted page images with the threshold value (e.g., as received in conjunction with the step 402).

At step 412, the size of the content in the extracted page images is modified based on the comparison. As discussed in conjunction with the step 314, the processor 202 may scale up/down the size of the content based on the determination whether the determined size of the content in an extracted page image is smaller/larger/equal to the threshold value.

At step 414, the processor 202 creates the one or more new N-Up documents based on the modified size of the content in the extracted N page images. In an embodiment, the processor 202 collates the one or more extracted N page images, with the modified size of the content, to create the one or more new N-Up documents such that the new N-Up documents include the size of the content as per the threshold values provided by the user. In an embodiment, the count of the one or more page images (i.e., the value of N) in the new N-Up documents may be different from the count of the one or more page images in the N-Up document. Further illustrations of the method for modifying the size of the content in the N-Up document, and for creating the one or more new N-Up documents have been described below in conjunction with FIG. 5.

A person having ordinary skill in the art would appreciate that the scope of the disclosure is not limited to extracting the one or more page images from the N-Up document. In an embodiment, the user may instruct the MFD 102b to scan one or more page images. Each of the one or more scanned page images are analyzed to determine a minimum font size. Based on the minimum font size and the threshold value provided by the user, the MFD 102b may modify the size of the content in each of the one or more scanned page image. Thereafter, the MFD 102b may collate the modified scanned page images to create one or more N-Up documents.

Figure 5:
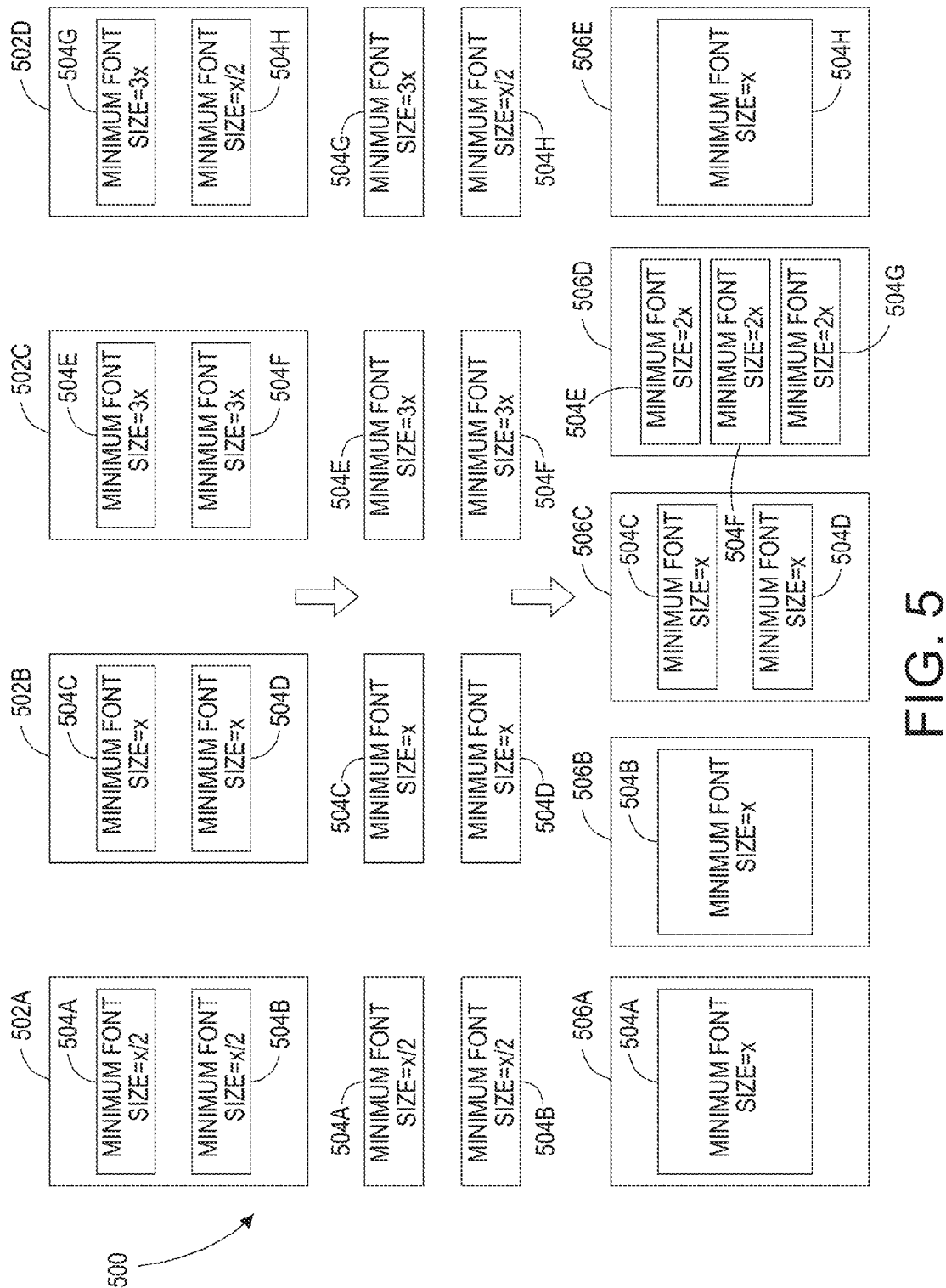
FIG. 5 illustrates a flow diagram for processing N-Up documents, in accordance with at least one embodiment.

FIG. 5 illustrates a flow diagram 500 for processing the N-Up documents, in accordance with at least one embodiment. The flow diagram 500 includes four N-Up documents 502a-d, the one or more page images 504a-h, and five new N-Up documents 506a-e. Each of the four N-Up documents 502a-d includes one or more page images. For example, as depicted, the N-Up document 502a includes the page images 504a-b, the N-Up document 502b includes the page images 504c-d, the N-Up document 502c includes the page images 504e-f, and the N-Up document 502d includes the page images 504g-h. It can be observed from the flow diagram 500 that in each of the N-Up documents 502a-d the count of the page images (i.e., the value of N) is two. Each of the one or more page images 504a-h include only text, however, it will be apparent to a person skilled in the art that image portions may also be included in the one or more page images 504a-h without departing from the scope of the disclosure. Each of the page images 504a-h includes the minimum font size associated with the text included in the respective page image. For example, as depicted, the page images 504a has the minimum font size of x/2, and the page image 504f has the minimum font size of 3x. Further, as depicted, the new N-Up documents 506a-e have different values of N. For example, the value of N for the new N-Up document 506a is one (since only one page image 504a is included in the new N-Up document 506a). FIG. 5 has now been described in conjunction with the FIG. 2, FIG. 3 and FIG. 4.

In accordance with the step 402, the threshold value for the size of the content is received. In an embodiment, the user provides the threshold value for the font size of the text portion as x.

In accordance with the step 404, the count of the one or more page images included in each of the N-Up documents 502a-d is determined. In an embodiment, the processor 202 determines that the count of the one or more page images for each of the N-Up documents 502a-d is two. Details about the determination of the count of the page images in the N-Up documents have already been discussed in conjunction with FIG. 3.

In accordance with the step 406, the one or more page images included in each of the N-Up documents 502a-d are extracted. As depicted in the flow diagram 500, eight page images (i.e., 504a-h) are extracted from the four N-Up documents 502a-d.

In accordance with the step 408, the font size associated with each of the extracted page images 504a-h is determined. In an embodiment, the processor 202 determines the minimum font size included in each of the extracted page images 504a-h. As depicted in the flow diagram 500, the processor 202 determines that the extracted page images 504a-h have the font size of $$\frac{x}{2}, \frac{x}{2}, x, x, 3x, 3x, 3x, \frac{x}{2},$$

respectively.

In accordance with the step 410, the processor 202 compares the font sizes as determined above $$\left(\text{i.e., } \frac{x}{2}, \frac{x}{2}, x, x, 3x, 3x, 3x, \frac{x}{2}\right)$$

with the threshold value provided by the user (i.e., x).

In accordance with the step 412, the processor 202 modifies the font size associated with each of the extracted page images 504a-h based on the comparison. It can be observed from the flow diagram 500 that the font size associated with the extracted page images 504a, 504b, and 504h are less than the required threshold value for font size (i.e., x). Further, the font size associated with the extracted page images 504c-d are same as the threshold value, and the font sizes associated with the extracted page images 504e-g are more than the threshold value. Thus, the processor 202 determines that each of the extracted page images 504a, 504b, and 504h requires scaling up of the font size, the font size associated with the extracted page images 504e-g requires scaling down, and the font size associated with the extracted page images 504c-d does not require scaling. In an embodiment, the processor 202 scales up the font size associated with each of the extracted page images 504a-b and 504h to two times (i.e., x), and scales down the font size associated with each of the extracted page image 504e and 504f to ⅔ times (i.e., x). Further, the processor 202 does not modify the font size of the extracted page images 504c-d.

In accordance with the step 414, the processor 202 creates the one or more new N-Up documents 506a-e based on modified font size. In an embodiment, the processor 202 determines that since two page images (i.e., 504a and 504b) with the minimum font size x/2 are included in the N-Up document 502a, only one page image with the font size x may be included in the new N-Up document 506a. In a similar way, the processor 202 collates other page images 504b-h to create the one or more new N-Up documents 506b-e. It can be observed from the flow diagram 500 that each of the new N-Up documents 506a-e includes the font sizes that are equal to or more than the threshold value for the font size. Further, it will be apparent from the flow diagram 500 that the value of N (i.e., the count of the page images) in each of the new N-Up documents 506a-b, and 506d-e is different from the value of N in the N-Up documents 502a-d.

Figure 6:
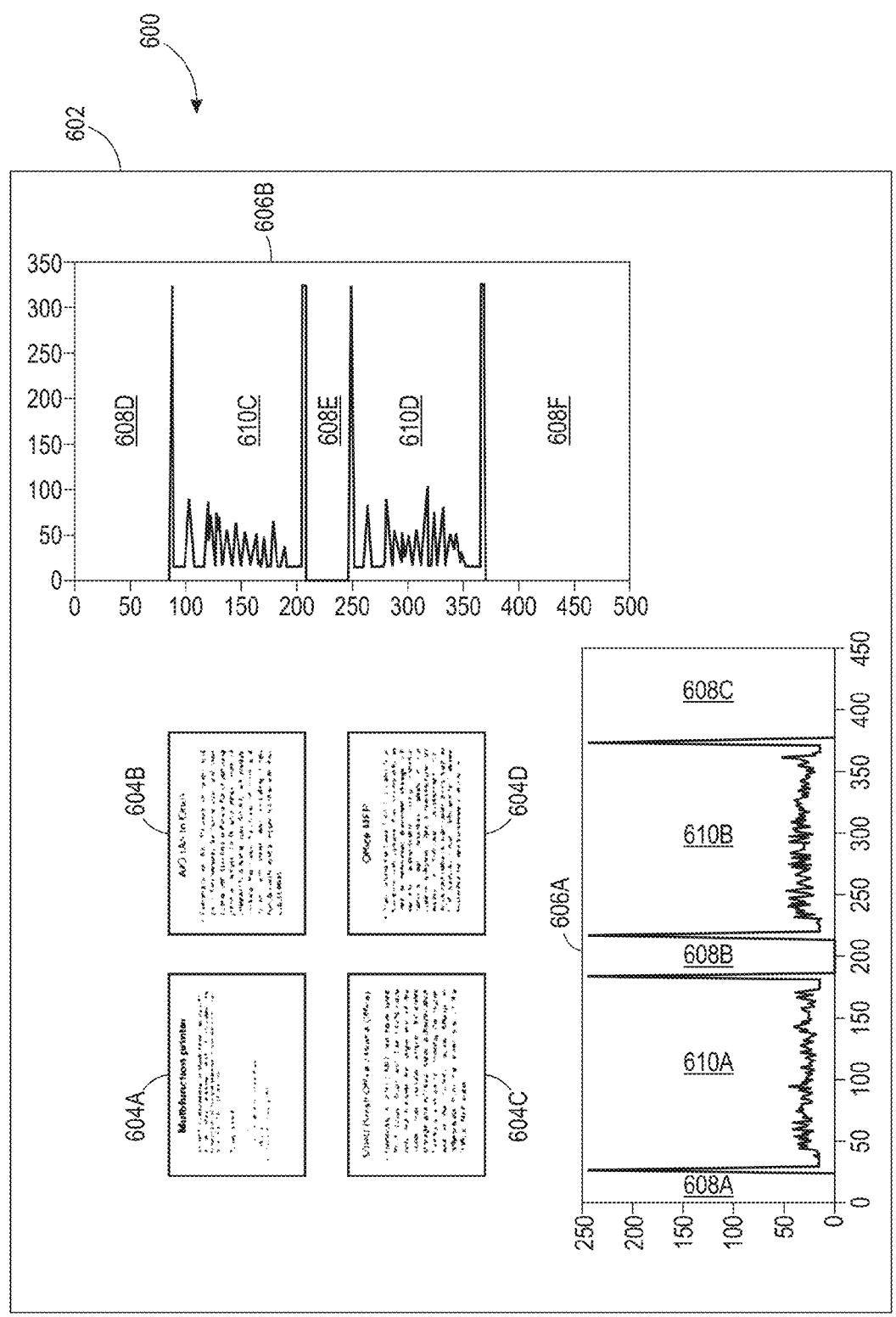
FIG. 6 is a block diagram illustrating determination of count of one or more page images in an N-Up document, in accordance with at least one embodiment.

FIG. 6 illustrates a block diagram 600 for determining the count of the one or more page images in the N-Up documents, in accordance with at least one embodiment. The block diagram 600 includes an N-Up document 602 that further includes four page images 604a-d. As depicted in the block diagram 600, the N-Up document includes two rows and two columns of the page images in the N-Up document. Further, the block diagram 600 includes a projection profile of pixels 606a along the horizontal direction of the N-Up document 602 and a projection profile of pixels 606b along the vertical direction of the N-Up document 602.

In an embodiment, the projection profile of pixels 606a corresponds to the plot of the summation of the intensity values of pixels present along the columns of the N-Up document 602. For example, as depicted in the block diagram 600, the projection profile of pixels 606a includes three valleys 608a-c and two areas 610a-b. In a similar way, the projection profile of pixels 606b includes three valleys 608d-f and areas 610c-d. In an embodiment, as depicted in the block diagram 600, the areas 610a-d depict the presence of the pixels in the corresponding areas of the N-Up document 602.

In an embodiment, the processor 202 determines that since the projection profile of pixels 606a along the horizontal direction of the N-Up document 602 includes three valleys 608a-c enclosing the two areas 610a-b, the N-Up document 602 includes two columns of the page images along the horizontal direction of the N-Up document. In a similar way, the processor 202 determines that the N-Up document 602 includes two rows of the page images along the vertical direction of the N-Up document 602. Thus, considering both the projection profiles (i.e., 606a and 606b), the processor 202 determines that the N-Up document 602 includes four page images (i.e., two in the horizontal direction of the N-Up document 602*two in the vertical direction of the N-Up document 602).

It will be apparent to a person skilled in the art that the block diagram 600 for determining the count of the page images in the N-Up document 602 has been provided just for illustration purposes and that the count of the page images in the N-Up document 602 may also be determined by other image processing techniques known in the art.

Figure 7:
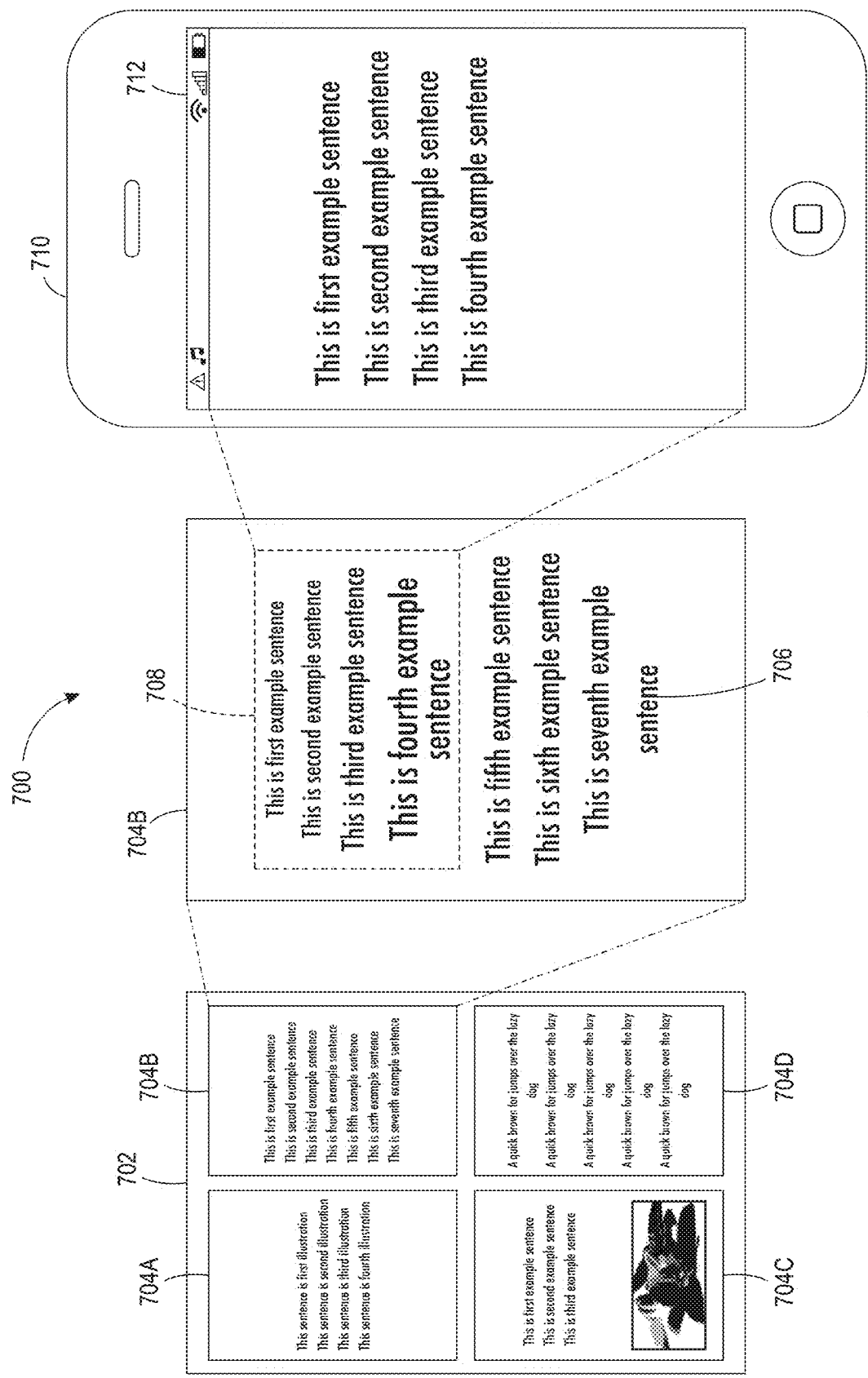
FIG. 7 is a block diagram illustrating modification of size of content in an electronic document, in accordance with at least one embodiment.

FIG. 7 illustrates a block diagram 700 for modifying the size of content in an electronic document, in accordance with at least one embodiment. The block diagram 700 includes an electronic document 702. In an embodiment, the electronic document 702 is an N-Up document and includes four page images 704a-d, as depicted in the block diagram 700. Further, the block diagram 700 includes an enlarged view of the page image 704b and a mobile device 710. Each of the page images 704a-d included in the electronic document 702 may include content of varying size. For example, as depicted in block diagram 700, the electronic document 704b includes the text with varying font size. Further, each of the page images 704a-d may include one or more image regions along with the text regions. For example, as depicted in the block diagram 700, the page image 704c includes image region along with the text region. The mobile device 710 includes a display area 712. FIG. 7 now has been explained in conjunction with FIG. 3.

In accordance with the step 302, the threshold value for the size of the content is received. In an embodiment, the user provides the threshold value for the font size of the text as 10. The user may provide the threshold value using the input devices associated with the mobile device 710. Further details about receiving of the threshold value have already been discussed in conjunction with the step 302.

In accordance with the step 304, count of the page images included in the electronic document 702 is determined. In an embodiment, a processor (not shown in the block diagram 700) associated with the mobile device 710 may determine the count of the page images included in the electronic document 702 by analyzing the projection profile of the pixels. In an embodiment, the processor determines that the count of the page images included in the electronic document 702 is four (i.e., 704a-d).

In accordance with the step 306, the processor determines that the electronic document 702 is an N-Up document (since the number of page images included in the electronic document 702 is four).

In accordance with the step 308, each of the page images 704a-d included in the electronic document 702 is extracted. That is, the processor extracts the four page images 704a-d. Further details about the extraction of the page images from the N-Up documents have already been discussed in conjunction with the step 308. In an embodiment, the processor may store the extracted page images 704a-d in a memory (not shown in the block diagram 700) associated with the mobile device 710.

In accordance with the step 310, the size of the content that will displayed in the display area 712 of the mobile device 710 is determined. In an embodiment, prior to displaying the contents of the electronic document 702 on the display area 712, the processor determines the portion of the content that will be displayed in the display area 712. For example, as depicted in the block diagram 700, the processor determines that the portion 708 will be displayed on the display area 712 of the mobile device 710. Further, the processor determines different sizes of the content included in the portion 708. For example, the processor determines that the text "This is first example sentence" has the font size of 4. In a similar way, the processor determines font sizes for the sentences: "This is second example sentence", "This is third example sentence", and "This is fourth example sentence" as 6, 8, and 12, respectively. Details about the determination of the size of the content in an electronic document have already been discussed in conjunction with the step 310.

In accordance with the step 312, the determined size of the content is compared with a pre-determined threshold value (received in conjunction with the step 302). As discussed above, the user provides the threshold value for the font size of the text as 10. Thus, the processor 202 compares the determined size of the content of the portion 708 (i.e., font sizes 4, 6, 8, and 12) with the pre-determine threshold value (i.e., the font size 10).

In accordance with the step 314, the size of the content included in the portion 708 is modified. In an embodiment, the processor 202 determines that each of the size (i.e., 4, 6, 8, and 12) is different from the threshold value provided by the user, and requires modification. That is, the processor 202 determines that the sentence "This is the first example sentence", "This is the second example sentence", and "This is the third example sentence" require scaling up of the font size; whereas the sentence "This is fourth example sentence" requires scaling down of the font size. In an embodiment, the processor 202 modifies the size of each of the sentence included in the portion 708 to the font size of 10. Subsequently, the mobile device 710 displays the contents included in the portion 708 with a font size of 10.

In an embodiment, as the user scrolls through the electronic document 702, the processor may modify the size of the content that is to be displayed in the display area 712. For example, as the user scrolls through the rest of the content in the page image 704b (e.g., the sentences: "This is fifth example sentence", and "This is the sixth example sentence"), the processor 202 may automatically modify the size of that content based on the pre-determined threshold value provided by the user, without further user-interaction.

It will be apparent to a person skilled in the art that though the modification of the size of the content included in the page image 704b has been discussed above, similar modification may be performed for other page images (i.e., page images 704*a-b*, and 704*d*) extracted from the electronic document 702. Subsequently, the processor 202 may display the contents, with modified size, for each of the page images included in the electronic document 702 on the display area 712. For example, the processor 202 may display the content, with modified size, of the electronic document 702 in the order: page image 704*a*, 704*b*, 704*c*, and 704*d*.

The disclosed embodiments encompass numerous advantages. Typically, while viewing electronic documents on the computing devices, the users have to manually adjust the zooming level of the content displayed to them. For example, the users may pinch the area of the display (e.g., using fingers) to zoom the size of the content. In addition, if the electronic document being viewed on the computing device is N-Up, the users may first have to navigate to the desired page image in the N-Up document, and then may have to zoom the size of the content. However, these solutions demand more number of user-interactions with the computing device that may further lead to increased computation, increased time, and increased processing power. Further, some of the techniques also facilitate the users to double-tap the touch-interface provided on the computing devices to zoom the size of the contents to a preset value. However, this type of scenario may not be suitable if the users encounter varying size of the content while navigating through the electronic document. In the various methods and systems for modifying the size of the content, as disclosed above, the size of the content may automatically be modified based on a pre-defined threshold value provided by the user and the size of the content being displayed on the computing device. Thus, number of user-interactions are reduced leading to savings of time, effort, computation, and processing power.

In addition, as disclosed in various embodiments above, the N-Up documents may be processed to modify the size of the content. Typically, to avoid paper wastage, multiple page images may be printed/scanned/copied in a single N-Up document. However, there may be scenarios, when the size of the content in the created N-Up document is too small to read. In such scenarios, if the original softcopies/hardcopies of the page images, from which the copied/scanned/printed N-Up document was created, are not available, then it might be difficult for the users to read the content effectively. Further, it might be possible that the size of the content in the N-Up document is large enough that the size may be scaled down to accommodate more page images in the N-Up document without making the size less than the threshold value provided by the user. Thus, in such scenarios, there might be a need to process the N-Up documents to obtain new N-Up documents with optimized number of the page images, without compromising on the readability of the individual page images. As disclosed in the various embodiments above, it is disclosed that the sizes of the content in the individual page images may be scaled up/down, such that the new N-Up documents have the size of the content more than or equal to the threshold value provided by the user. Alternatively, the count of the page images in the N-Up documents is modified such that more page images are combined, without sacrificing on the readability requirements provided by the user.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++', Java, and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for processing the documents have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for processing an N-Up document comprising one or more page images, the method comprising:
   extracting, by one or more processors, said one or more page images from said N-Up document based on an analysis of a content distribution in said N-Up document;
   determining, by said one or more processors, a size of said content in at least a part of said extracted one or more page images; and
   modifying, by said one or more processors, said size of said content in accordance to a pre-determined threshold value received from a user.

2. The method of claim 1, wherein said content distribution is analyzed using at least one of a projection profile of pixels across a horizontal direction and a vertical direction in said N-Up document, boundary detection methods, or segmentation methods.

3. The method of claim 1 further comprising determining, by said one or more processors, a count of said one or more page images in said N-Up document based on said analysis.

4. The method of claim 1, wherein said size of said content is determined based on one or more segmentation methods.

5. The method of claim 1, wherein said N-Up document corresponds to at least one of an electronic N-Up document or an N-Up printed document.

6. The method of claim 1 further comprising creating, by said one or more processors, one or more new N-Up documents by collating said one or more page images with said modified size.

7. The method of claim 1, wherein said content corresponds to at least one of a text portion or an image portion in said one or more page images.

8. A method for processing an electronic document on a computing device, the method comprising:
   determining a size of at least a part of a content in one or more page images from said electronic document, wherein a count of said one or more page images from said electronic document is determined based on an analysis of a projection profile of pixels across a horizontal direction and a vertical direction in said electronic document; and
   modifying said size of said part of said content based at least on a pre-determined threshold value for size and said determined size.

9. The method of claim 8, wherein said pre-determined threshold value is determined based at least on an input from a user.

10. The method of claim 8, wherein said size corresponds to a font size of a text portion of said content.

11. The method of claim 8, wherein said electronic document corresponds to an N-Up document comprising said one or more page images.

12. The method of claim 11 further comprising extracting said one or more page images from said N-Up document based on said analysis.

13. The method of claim 8, wherein said computing device corresponds to at least one of a mobile device, a smartphone, a tablet, a phablet, or a personal digital assistant (PDA).

14. A system for processing an N-Up document comprising one or more page images, the system comprising:
   one or more processors operable to:
      extract said one or more page images from said N-Up document based on an analysis of a content distribution in said N-Up document;
      determine a size of said content in at least a part of said extracted one or more page images; and
      modify said size of said content in accordance to a pre-determined threshold value received from a user.

15. The system of claim 14, wherein said content distribution is analyzed using at least one of a projection profile of pixels across a horizontal direction and a vertical direction in said N-Up document, boundary detection methods, or segmentation methods.

16. The system of claim 14, wherein said one or more processors are further operable to determine a count of said one or more page images in said N-Up document based on said analysis.

17. The system of claim 14, wherein said size of said content is determined based on one or more segmentation methods.

18. The system of claim 14, wherein said N-Up document corresponds to at least one of an electronic N-Up document or a printed N-Up document.

19. The system of claim 14, wherein said one or more processors are further operable to create one or more new N-Up documents by collating said one or more page images with said modified size.

20. The system of claim 14, wherein said content corresponds to at least one of a text portion or an image portion in said one or more page images.

21. A system for processing an electronic document on a computing device, the system comprising:
   one or more processors operable to:
      determine a size of at least a part of a content in one or more page images from said electronic document, wherein a count of said one or more page images from said electronic document is determined based on an analysis of a prosection profile of pixels across a horizontal direction and a vertical direction in said electronic document; and modify said size of said part of said content based at least on a pre-determined threshold value for size and said determined size.

22. A computer program product for use with a computer, the computer program product comprising a non-transitory computer readable medium, wherein the non-transitory computer readable medium stores a computer program code for processing an N-Up document comprising one or more page images, wherein the computer program code is executable by one or more processors to:

extract said one or more page images from said N-Up document based on an analysis of a content distribution in said N-Up document;

determine a size of said content in at least a part of said extracted one or more page images; and modify said size of said content in accordance to a pre-determined threshold value received from a user.

23. A computer program product for use with a computer, the computer program product comprising a non-transitory computer readable medium, wherein the non-transitory computer readable medium stores a computer program code for processing an electronic document on a computing device, wherein the computer program code is executable by one or more processors to:

determine a size of at least a part of a content in one or more page images from said electronic document, wherein a count of said one or more page images from said electronic document is determined based on an analysis of a projection profile of pixels across a horizontal direction and a vertical direction in said electronic document; and modify said size of said part of said content based at least on a pre-determined threshold value for size and said determined size.

\* \* \* \* \*